2,811,451

PROCESS OF PREPARING EXTRACTS FROM SEAWEEDS OF THE EUCHEUMA FAMILY

Sie Lian Tjoa, Surabaya, Indonesia

No Drawing. Application November 30, 1953, Serial No. 395,268

4 Claims. (Cl. 99—131)

This invention relates to a method of preparing colloidal, organic solutions from seaweeds, preferably after external rinsing and after very thorough crushing, and to their dried final products.

These solutions are suitable as additions to articles of food, such as ices for consumption, cocoa mixtures and the like, in order to increase their degree of stability. The expression "ice for consumption" is intended to include all prepared kinds of ice, like ice cream, fruit ice etc.

The invention also relates to the products obtained with these solutions or with their dried final products.

It is known to add one or more stabilizing substances in the preparation of articles of food, like various kinds of ice for consumption not only in order to check ice formation but also in order to obtain a homogeneous mass and to keep the same stable. It has been usual to use as stabilizers inter alia eggs, alginates, gelatine, tragacanth etc. but with these substances the object aimed at was only partly attained. The cause was that stabilizing was attained inter alia by gel-forming, which results to a large extent in a pudding-like mass. In the application to ices for consumption this led to troubles in the freezing installation during freezing, since through the stiffening of the pudding against the walls of the container, the blades got stuck.

Moreover, pudding-like ice will not melt evenly, which is the first requirement for good ice for consumption. With too small an amount of the known substances, however, the stabilizing capacity cannot be maintained during storage. Non-gelling stabilizers e. g. egg yolk etc. are either too expensive or do not stabilize permanently. For this reason, ice cream makers have hitherto been searching for the right mixture of the various stabilizers. What one thickener lacked was supplied by adding another one, but it was never perfect.

Further, most suitable thickeners or stabilizers, like gelatine and alginates, are not fit for use in the so-called cold ready-mix; in the case of gelatine because it is only soluble at a temperature higher than room temperature, and alginates because they are extremely difficult to disperse, while the requirements of a good ready-mix are that these must be ready to be frozen immediately after the addition of water of room temperature. The known stabilizers which satisfy this requirement, like gum arabic, do not impart the required nice appearance, and especially taste, to well prepared ice.

All these disadvantages are completely removed by the use of the solutions, concentrated by evaporation or not, prepared by the method according to the invention.

A cocoa-milk mixture has the known disadvantage that it must be continually stirred to provide a good drink. This is caused by the settling down of the cocoa particles, which remain at the bottom when the mixture stands. This is no disadvantage when used in the house but, seeing the enormous proportions that the use of bottled chocolate drinks have assumed, it is necessary that the chocolate-powder shall remain in suspension in the solution. Up to now, the known stabilizers have not solved this problem. This solution is provided by the use of a stabilizer prepared by the method according to the invention. The new stabilizer keeps the chocolate particles in complete suspension at any temperature without excessively thickening the liquid and does not affect the chemical properties of the milk. It also facilitates the rinsing of the bottles.

The use of the stabilizers according to the invention has the following advantages:

(1) When added to solid articles of food, like different kinds of ice for consumption, and to liquid ones, like cocoa mixtures, in which the proportions can be more extensively varied than with the known stabilizers, their stabilizing action is permanent;

(2) They can be added at any temperature;

(3) The various articles of food can be stored for a long time without showing undesirable changes in their composition, taste and appearance;

(4) Only small quantities of the stabilizer are necessary to attain the purpose in view;

(5) In the application to ice for consumption the particular advantage is that the so much desired smoothness is obtained without the ice melting too soon as is the case with the present kinds of ice. This is something quite new because up to now it was always assumed that smoothness was accompanied by instant melting at room temperature. If one had a kind of ice that did not melt easily this was hitherto due to the gelling action of the stabilizer which gave a pudding-like product in which smoothness and ready melting by the tongue was sacrificed. The new stabilizer produces an absolutely smooth ice for consumption which melts very slowly and keeps its fresh taste and color even after long storage.

According to the invention the new stabilizers are produced from sea weeds by a suitable choice of temperature of extraction.

According to the invention, seaweeds of the Eucheuma family are preferably chosen, such as the *Eucheuma muricatum* and related kinds. For certain purposes, the seaweed is extracted after external rinsing and after thorough crushing, so that the mucous substances between the cells are freed, with water, acidified or not, or alkaline or not, and followed, or not, by a neutralizing process, at a temperature not greater than about 40° C., preferably at a room-temperature of about 30° C.

In order to facilitate the extraction of the seaweed at low temperatures, it has been found that by first immersing the rinsed weed for some time in a salt solution, followed by washing of the adherent salt, the rate of diffusion is greatly increased.

Through this extraction certain mucous substances are bound by the water and this colloidal, organic solution is afterwards separated from the seaweed mass in the known way. After filtration, a stabilizing solution is obtained which is particularly suitable for use in ice for consumption.

Of course, the extraction may be repeated at the same temperature. It is typical of this stabilizer (solution) that it remains liquid, also in high concentration, at any temperature between freezing and boiling points.

This solution can be used and sold as such or as powder after it has been concentrated by evaporation and dried, on cylinders or by deposition, e. g. with alcohol, and further pulverized. For the sake of clarity this stabilizer is hereinafter referred to as "A."

If this new stabilizer is used in beverages like cocoa mixtures and the like it appears that with normal proportions the chocolate particles do not remain in suspension when standing for some time. In this case a stabilizer of thixotropic nature has to be used.

A suitable stabilizer having this property can also be separated from the seaweeds mentioned.

According to the invention, the residue of the seaweed can now be further extracted with water, acidified or not, or alkaline or not, and followed or not, by a neutralizing process at a temperature not greater than about 75° C., preferably at about 50° C. After repeated extraction and separation of the seaweed mass a stabilizing liquid (solution) is obtained, hereinafter referred to as "B." As in the case of the stabilizer A, this solution can also be concentrated by evaporation and dried, whereby a stabilizer B in powder form is obtained. This stabilizer is of thixotropic nature.

The addition of very small quantities of this thixotropic gel to cocoa-mixtures gives a surprising result, because the cocoa particles remain completely in suspension. Thus, the use of the known stabilizers which considerably thicken the liquid and give a thick, strongly viscous liquid feeling in the mouth, not liked by most consumers, can be dispensed with.

The seaweed can also be extracted in the first instance after external rinsing and thorough crushing with water, acidified or not, or alkaline or not, and followed, or not, by a neutralizing process at a temperature not greater than about 75° C., preferably at about 50° C.

The stabilizing solution obtained by this direct extraction at a temperature not greater than about 75° C., is hereinafter referred to as "C" and consists of a mixture of the stabilizers A and B. It appears to be impossible to give the ice the same smooth property as is obtained when only the stabilizer A is used. It therefore seemed necessary not to use the stabilizer B, in order to obtain the best result in the case of ice for consumption.

This is not necessary in the case of drinks. As regards drinks stabilizer B or C is preferred, this being dependent on the kind of drink, if it is a cocoa mixture or a sherbet. Thus, even for a particular kind of ice for consumption, such as ice on sticks, only B will be necessary, to keep the ice on sticks hard; for cocoa-mixtures only B is required, while for sherbets and the like C would suffice.

It thus appears, that according to the kind of article of food only the stabilizer A, or only B, or a combination of A and B=C has to be applied to obtain the best result.

The proportion of A and B in C can be adjusted as desired. When A and B have been obtained separately, a certain stabilizer C can be obtained by joining both stabilizers in certain proportions.

Stabilizer C will contain more or less B with extraction in one operation, according to the temperature of extraction. After some experimentation a certain proportion of A and B in C could be obtained by extraction in one operation at a predetermined temperature. Stabilizer B can be used in sherbets, but C is also satisfactory. Stabilizer C is particularly suitable for use in the cosmetic industry.

For some purposes a stabilizer is necessary which becomes a complete gel after cooling without the addition of acids or sugars, and keeps its form under most variable temperatures. Stabilizer B cannot serve for this purpose because it is a thixotropic substance. Thus, for preserving meat, fish, etc., it is necessary that the meat or the fish is completely enveloped by the pudding and keeps its form with temperatures of 0–50° C. Moreover, for this purpose, it is necessary that gel-forming shall take place while the mass is moving, or vibrating.

As is known, gelatine cannot meet this requirement under all circumstances, while pectin is completely out of the question, because with such preserves neither sugar nor acid is used. Of the known substances agar-agar would be satisfactory in this case, but this substance has the great disadvantage that gel-forming can only take place in a completely stationary condition. Agar-agar cannot be used in large quantities on a conveyer on which the liquid is subject to continual vibration. The stabilizer according to the invention hereinafter referred to as "D" will give satisfactory results in this case.

This stabilizer is obtained from the same kind of seaweeds. The seaweed mass from which the stabilizers A and B have already been extracted, is subjected to a new extraction with water, acidified or not, or alkaline or not, and followed, or not, by a neutralizing process at a temperature of 100° C. or higher. The colloidal solution obtained after separation and filtration, can again be used as such, or as dry powder or flakes after having been concentrated by evaporation.

Except for the preservation of meat and fish, this stabilizer can render good service as a mechanical laxative, and it is particularly suitable for use in tablets. This stabilizer can absorb very large quantities of water, so that it is also particularly suitable for use in custards, jellies and the like. The use in tablets has the advantage that these tablets easily disintegrate when put into a liquid.

The seaweed can be extracted also at boiling or even higher temperature after having removed the only stabilizer A. The colloidal solution, which is now obtained, after separation and filtration, or not, and is hereinafter referred to as "stabilizer E," must contain D and B.

This kind of seaweed can be extracted at 100° C. or at higher temperature, after preliminary rinsing or not, as such, or after complete or incomplete crushing, in the first instance, with water, acidified or not, or alkaline or not, and followed, or not, by a neutralizing process. The obtained colloidal solution referred to as "stabilizer F," contains, after separation and filtration, the stabilizers A, B and D together.

The stabilizer F can also be obtained by combining the separate stabilizers A, B and D in a certain proportion, depending on the circumstances.

Although the stabilizers E and F can be used for the same purposes as those for which D is used separately, it must be stated that especially F is particularly suitable for tablets. Also for use in cod liver oil emulsions stabilizer F is very suitable. For custards and jellies, stabilizer D is to be preferred because their tastes become less pleasant through the presence of A when F is used.

Except as addition in the preparation of articles of food and of cosmetics, these colloidal solutions can be used as stabilizers also in a dry condition in the manufacture of paper and in the textile (as finish) and paint-industries and also in pharmacy.

Extraction can be facilitated by slightly acidifying the extracting liquid or by keeping it alkaline, followed or not, by a neutralizing process. However, this has the disadvantage that the solutions obtained acquire a less stabilizing capacity. The duration of the extraction with acidified or alkaline water has to be strictly observed in order to obtain separate solutions of A, B and D with the highest viscosities. This is not necessary when a neutrality reacting liquid for extraction is used.

Here are a few examples showing how to obtain these stabilizers and how they have to be used.

*Example 1*

A certain quantity of seaweed of the Eucheuma kind is first crushed, after preliminary rinsing, and preferably after having been immersed for a certain period of time in a salt-solution, and is then washed free of the salt. This crushed seaweed mass is then extracted with neutrally reacting water of a temperature not greater than about 40° C., preferably of room-temperature of about 30° C. After repeated extraction and after separation by which stabilizer A is obtained, the mass is again extracted with water of a temperature not greater than about 75° C., preferably of about 50° C. After repetition, or not, this gives a stabilizing solution B. It is desirable to carry out the process in such a way that stabilizer A is first practically completely removed from the seaweed mass before the extraction of B is started. When stabilizer B has completely been extracted from the seaweed mass, the latter is again extracted with neutrally reacting water of 100° C. or of higher temperature, whereby stabilizer D is obtained. After concentration by evaporation, and after further treatment, each of these stabilizers can also be used in the form of powder.

*Example 2*

A certain quantity of seaweed of the *Eucheuma muricatum* kind is placed in water of a temperature not greater than about 75° C., preferably 50° C., after preliminary external rinsing. It remains therein for a certain time, by the duration of the extraction being determined the viscosity of the solution. This extraction may be repeated. The extraction may be carried out in an ordinary pan or in a special extraction battery, with or without the use of counterflow. After separation and filtration, a colloidal solution is obtained, consisting of the stabilizers A and B. This extracted solution can be used as such in drinks and the like, and also as dry powder, after the usual treatment.

*Example 3*

A certain quantity of sea-weed of the Eucheuma kind is first crushed after preliminary external rinsing and after a further rinsing extracted at a temperature not greater than about 75° C., preferably at about 50° C., and is then further treated and used as in Example 2.

The following are examples of the use of the stabilizers inter alia in articles of food like ice for consumption.

*Example 4*

Stabilizer A in liquid colloidal form is added to a mixture prepared for a certain ice for consumption or the like, after which follows the known and usual treatment to obtain the ice desired, after mixing it well.

*Example 5*

For the preparation of powders for ices for consumption stabilizer A in solution can be added to the other ingredients and then be dried and pulverized to a dry powder in the known way.

*Example 6*

Stabilizer A in powder form may be added as such to the various dried mixtures for kinds of ices for consumption and the like.

*Example 7*

Stabilizer A may also be added to other known stabilizers to increase the favourable action.

What I claim is:

1. The process of preparing extracts from seaweed of the Eucheuma family comprising the steps of externally rinsing the seaweed, immersing the seaweed in a salt solution to increase diffusion, washing off the adhering salt from the immersed seaweed followed by extracting repeatedly with water at temperatures of from approximately 30° to 100° C., subsequently separating the extracts from the seaweed mass, and then concentrating the extracts by evaporation.

2. The process of preparing extracts from seaweed of the Eucheuma family as in claim 1, and wherein the extraction water is slightly acid, and including the step of subsequently neutralizing the extracts.

3. The process of preparing extracts from seaweed of the Eucheuma family as in claim 1, and wherein the extraction water is slightly alkaline, and including the step of subsequently neutralizing the extracts.

4. The process of preparing extracts from seaweed of the Eucheuma family as in claim 1, and wherein the extraction steps are carried out at increasing temperatures starting at from 30° to 40° C., subsequently extracting at from 50° to 75° C., and finally extracting at at least 100° C.

References Cited in the file of this patent

UNITED STATES PATENTS

| 2,446,091 | Humm | July 27, 1948 |

FOREIGN PATENTS

| 142 | Great Britain | 1881 |
| 13,289 | Great Britain | 1898 |

OTHER REFERENCES

The Annals of Applied Biology (British), vol. 7, 1921, pp. 352–362.

Food Manufacture, June 1943, pp. 183, 184, 185.